Nov. 18, 1952     P. P. NEWCOMB     2,618,358
AIR SCREEN FOR JET ENGINES

Filed Jan. 20, 1951     3 Sheets-Sheet 1

Inventor
Philip P. Newcomb
by Charles A. Warren
Attorney

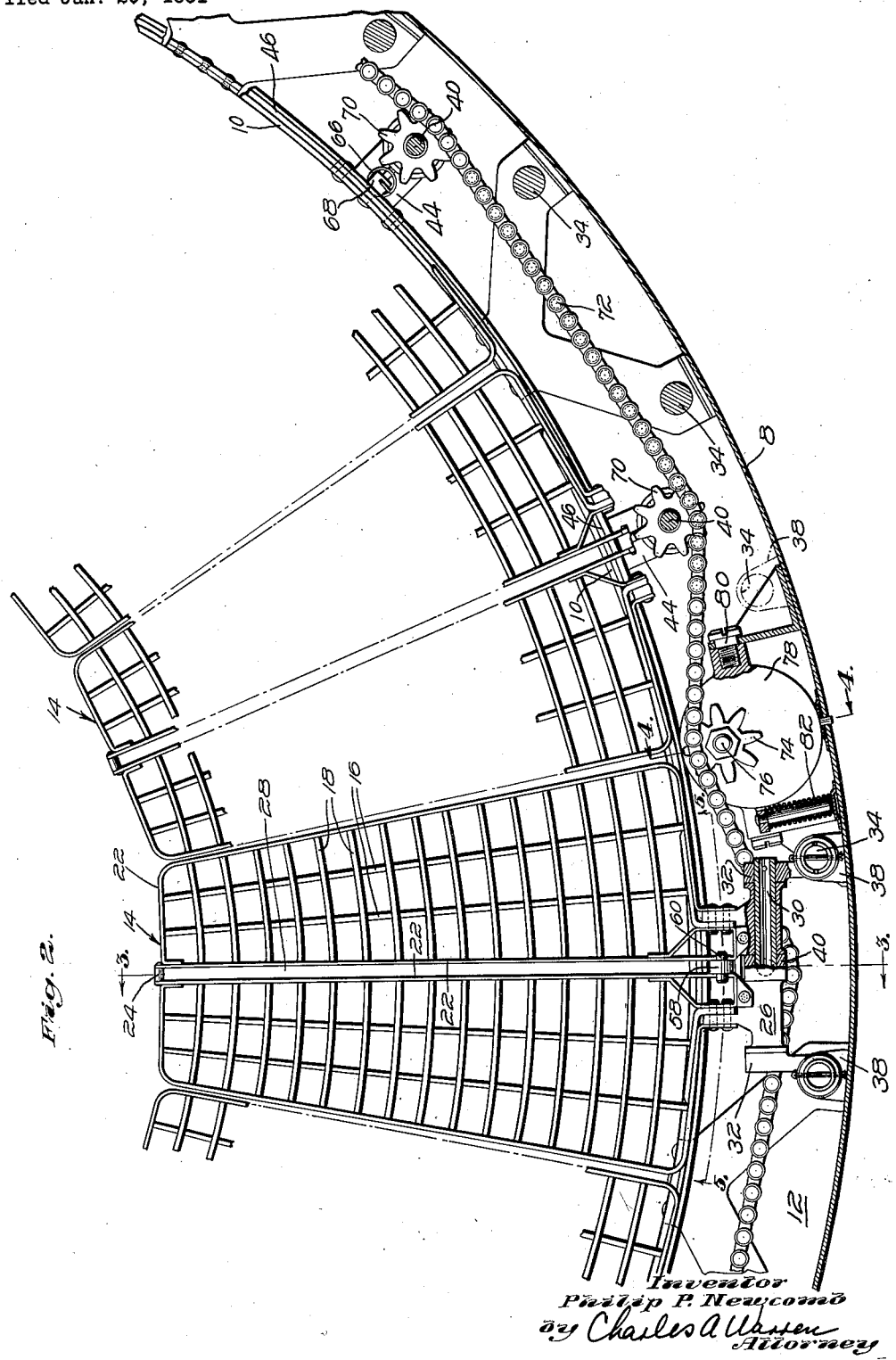

Nov. 18, 1952 P. P. NEWCOMB 2,618,358
AIR SCREEN FOR JET ENGINES
Filed Jan. 20, 1951 3 Sheets-Sheet 3
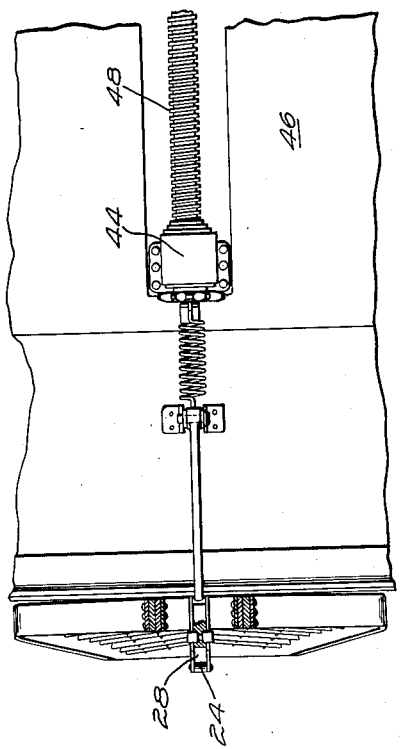
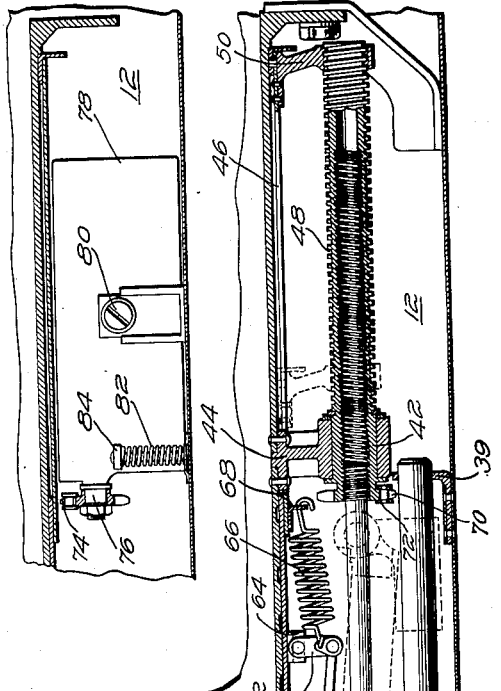
Inventor
Philip P. Newcomb
by Charles A. Warren
Attorney Patented Nov. 18, 1952

2,618,358

UNITED STATES PATENT OFFICE 2,618,358

AIR SCREEN FOR JET ENGINES

Philip P. Newcomb, Manchester, Conn., assignor to United Aircraft Corporation, East Hartford, Conn., a corporation of Delaware Application January 20, 1951, Serial No. 206,963

7 Claims. (Cl. 183—62)

This invention relates to a screen for the air inlet of a power plant and particularly to a retractable screen for use in the gas turbine type of power plant.

It has been found advantageous to provide a screen to prevent the entrance of foreign material into the power plant inlet particularly while the power plant is operating on the ground or at low altitudes. Such a screen, however, inevitably impedes the flow of air into the inlet to some extent and accordingly the use of this screen involves some loss of power in the power plant. A feature of this invention is an arrangement for retracting the screen into a position where it will not impede the air flow when the screen is not needed.

In many instances the air inlet to a gas turbine type of power plant is annular for directing the flow of air into the compressor. A feature of the invention is a screen made up of separate segments which can be moved into or out of operative position in the annular air passage. Another feature is an arrangement for simultaneously retracting all of the segments at one time into an inoperative position.

Other objects and advantages will be apparent from the specification and claims, and from the accompanying drawings which illustrate an embodiment of the invention.

Fig. 2 is a front elevation of the screen and supporting structure with parts broken away.

Fig. 3 is a sectional view substantially on the line 3—3 of Fig. 2.

Fig. 4 is a fragmentary sectional view along the line 4—4 of Fig. 2.

Fig. 5 is a fragmentary sectional view along the line 5—5 of Fig. 2.

Figure 1:
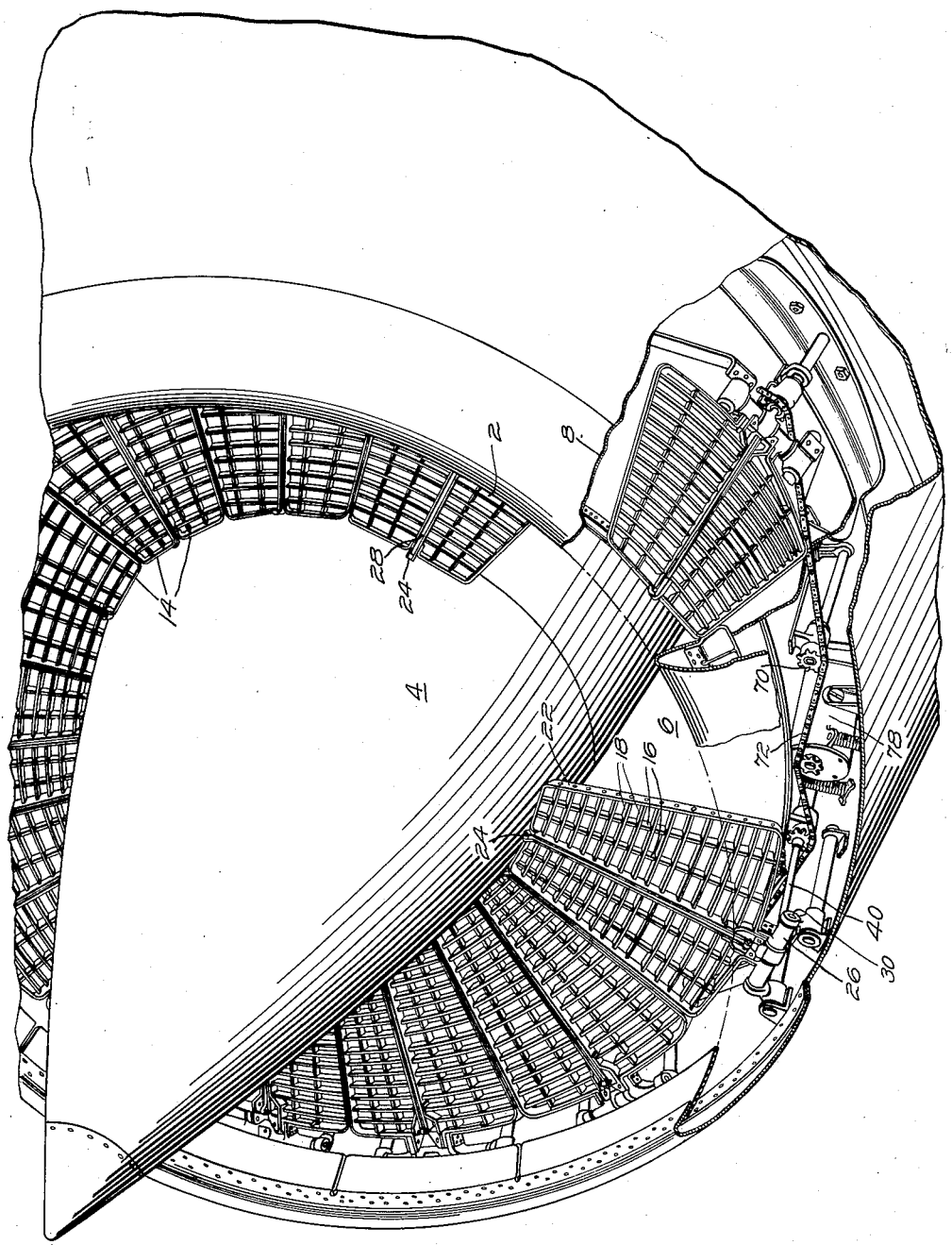
Fig. 1 is a perspective view of a power plant inlet showing the screen in operative position except for one segment which is in the inoperative position.

The invention is shown as applied to the inlet of a gas turbine type of power plant in which the screen 2 extends between the inner cone 4 defining the inner wall of the annular inlet passage 6 and the cowling 8 which forms in general the outer wall of the passage. As shown in Fig. 3 a sleeve 10 located within and spaced from the cowling 8 forms a part of the outer wall of the inlet duct and defines a space 12 between the cowling and sleeve which encloses the actuating mechanism for the screen.

As shown in Figs. 1 and 2 the screen is made up of individual segment shaped elements 14 which in the operative position of Figs. 1 and 2 form a substantially complete screen for the annular inlet. The segments extend across the inlet between the forward edge of the sleeve 10 and the cone 4 and are in substantially edgewise engagement. Although the particular structure of each screen segment is not critical, the structure shown involves a number of radially extending webs 16 circumferentially spaced apart and a number of intersecting circumferentially extending webs 18 which are radially spaced apart. As best shown in Fig. 3 the radially extending webs are notched as at 20 to receive the trailing edges of the circumferentially extending webs and the assembly of webs is held in position by a surrounding substantially continuous frame 22. Two of the assemblies of intersecting webs with the surrounding frame 22 are held together as by a connecting pin 24 at the inner ends and by a connecting bracket 26 at the outer ends to define a screen segment having a centrally located radially extending slot 28. The frames are securely connected to bracket 26 to move therewith.

Each segment is pivotally supported at its outer end on a pin 30, Figs. 2 and 3, which provides a pivotal support for the bracket 26. The pin 30 extends between spaced supporting members 32 which are slidable on supporting rods 34 extending in a direction substantially parallel to the flow of air through the duct. Each of the members 32 has an integral sleeve portion 36 which slides on the rod 34. Each pair of rods 34 may be mounted on the cowling 8 as by mounting brackets 38 at the upstream end and other brackets 39 at the downstream end.

In retracting the screen segments from operative position across the inlet, the supporting members 32 for each segment are pulled rearwardly by means of a rod 40 the forward end of which is pivotally mounted on pin 30 and the other end of which is threaded to engage with cooperating threads on the inner surface of a sleeve 42. This sleeve is journalled in a bracket 44 which is attached to the fixed sleeve 10 so that as the sleeve 42 is turned in one direction the rod 40 is pulled rearwardly causing the screen to pivot forwardly into the position shown by the dotted lines, Fig. 3.

At the same time that the rod 40 is being pulled rearwardly, a movable sleeve 46 surrounding and substantially in contact with the sleeve 10 is moved forwardly to form an extension of the sleeve 10. For actuating the sleeve 46 the sleeve 42 has external threads 48 engaging with a threaded bracket 50 attached to the rearward end of sleeve 46. It will be noted, as shown in Fig. 5, that the sleeve 46 is slotted to fit around the brackets 44. The threads 48 are opposite to the threads engaging with the rod 40 so that when the rod is pulled rearwardly the sleeve 46 will be moved forwardly. The forward end of this sleeve engages and rides along on the back surface of the screen such that the screen is caused to swing down into retracted position more rapidly than if the sleeve 46 remained stationary.

In the retracted position of the screen, at which time the sleeve 46 is in its forward position (the dotted line position of Fig. 3), the sleeve 46 holds the several screen segments against the frusto-conical ring 52 which forms a rearwardly projecting extension on the in-bent forward end 54 of the cowling 8. The ring 52 is provided with spaced notches 56 which provide a resilience for the ring in a radial direction so that the screen segments are held resiliently against the sleeve 46 when the segments are in the retracted position.

When the screen is moved into operative position by moving the supporting pin forwardly and at the same time retracting the sleeve 46 the screen is resiliently pulled into its operative position by means of a rod 58 having a laterally projecting pin 60 in its forward end which, as best shown in Fig. 2, overlies the portions of the supporting frame 22 which define the opposite walls of the radially extending slot 28. This slot provides a space for the rod 58 to move through during the retraction of the screen. The other end of the rod 58 is pivoted on a link 62 which in turn is pivoted on a bracket 64 on the sleeve 46. A coil spring 66 extends between the rearward end of the rod 58 and another bracket 68 on the sleeve 46 thereby resiliently holding the screen in such a position that it is in engagement with the sleeve 46 at all times.

For actuating the several threaded sleeves 48 for simultaneous movement of all of the screen segments, each sleeve carries a sprocket 70 at its forward end adapted to engage with an endless chain 72 which passes over all of the sprockets and also over a driving sprocket 74 on the shaft 76 of a suitable driving means such for example as a geared motor 78. The chain passes over the outer sides of the sprockets 70 and over the inner surface of sprocket 74 as shown. For keeping the chain 72 under suitable tension the motor 78 is mounted on trunnions 80 and at a point adjacent the sprocket is supported on coil springs 82 which engage with lugs 84 on the motor. In this arrangement the springs 82 continuously tend to move the sprocket end of the motor radially inwardly in a direction for tightening the chain.

It is to be understood that the invention is not limited to the specific embodiment herein illustrated and described, but may be used in other ways without departure from its spirit as defined by the following claims.

I claim:

1. A screen for a power plant having a duct through which air flows, said screen including a series of grids each forming a segment of the screen and together forming a closure wall in said duct, a pivotal support for each grid, means for pivoting said grids into a position parallel to and out of the path of the air flow in said duct, and means for moving all of said grids as a unit into inoperative position, said last means including a cylinder forming a part of the outer wall of the air duct and engaging with said grids, and means for moving said cylinder axially to cause pivotal movement of the grids on their pivots.

2. A screen for a power plant having a duct through which air flows, said screen including a series of grids each forming a segment of the screen and together forming a closure wall in said duct, a pivotal support for each grid, means for pivoting said grids into a position parallel to the path of the air flow in said duct, and means for moving all of said grids as a unit into inoperative position, said last means including a cylinder forming a part of the outer wall of the air duct and engaging with said grids, and means for moving the pivotal axis of the grids axially to cause pivotal movement of the grids into or out of operative position.

3. A screen for a power plant having a duct through which air flows, said screen including a series of grids each forming a segment of the screen and together forming a closure wall in said duct, a pivotal support for each grid, means for pivoting said grids into a position parallel to the path of the air flow in said duct, and means for moving all of said grids as a unit into inoperative position, said last means including a cylinder forming a part of the outer wall of the air duct and engaging with said grids, means for moving said cylinder axially to cause pivotal movement of the grids on their pivots, and means for moving the pivotal axis of the grids axially to cause pivotal movement of the grids into or out of operative position.

4. In a gas turbine power plant having an annular gas path, the combination of a device adapted to be positioned in the gas path, said device being made up in segments, a pivotal support for each segment located outside of the gas path, means spaced from said pivotal supports and engaging with said segments, and means for shifting the pivotal supports axially for pivoting said segments into or out of operative position, said segments in inoperative position being located outside of the gas path.

5. In a gas turbine power plant having an annular gas path, the combination of a device adapted to be positioned in the gas path, said device being made up in segments, a pivotal support for each segment located outside of the gas path, means for shifting the pivotal supports axially as a unit for causing movement of said segments into or out of operative position, said segments in inoperative position being located outside of the gas path, and means engageable with said segments and movable in a direction opposite to the movement of the pivotal supports during movement of the segments into inoperative position, said last means forming an extension of a part of the wall defining the gas path and enclosing said segments.

6. A gas turbine power plant having an annular air inlet, in combination with a screen for said inlet comprising a series of grids each forming a segment of the screen and together forming a substantially continuous screen extending across the annular air path, a pivotal support for each segment located outside of the air path, and means for moving said segments about their pivots into a position out of the air path, said means including a sleeve forming a part of the wall of the air path and engaging with said segments at a point spaced from the pivotal support for each segment, and means for moving said sleeve axially to cause pivotal movement of said segments.

7. A gas turbine power plant having an annular air inlet, in combination with a screen for said inlet comprising a series of grids each forming a segment of the screen and together forming a substantially continuous screen extending across the annular air path, a pivotal support for each segment located outside of the air path, means for moving said segments about their pivots into a position out of the air path, and an outer wall forming member engaging with said segments at a point spaced from the pivotal supports movable with said segments and overlying said segments in inoperative position and means for resiliently holding said segments against said sleeve.

PHILIP P. NEWCOMB.

REFERENCES CITED

The following references are of record in the file of this patent:

UNITED STATES PATENTS

| Number | Name | Date |
|---|---|---|
| 2,534,138 | Marshall | Dec. 12, 1950 |
| 2,546,153 | De Remer | Mar. 27, 1951 |
| 2,555,592 | Kelly | June 5, 1951 |